Jan. 26, 1965     O. PIVERT, SR     3,167,199
SELF-UNLOADING TRUCK BODY
Filed Dec. 22, 1961     7 Sheets-Sheet 1

Oliver Pivert, Sr.
INVENTOR.

Jan. 26, 1965   O. PIVERT, SR   3,167,199
SELF-UNLOADING TRUCK BODY
Filed Dec. 22, 1961   7 Sheets-Sheet 5

Fig. 8

Oliver Pivert, Sr.
INVENTOR.

Jan. 26, 1965

O. PIVERT, SR 3,167,199

SELF-UNLOADING TRUCK BODY

Filed Dec. 22, 1961

Oliver Pivert, Sr.
INVENTOR.

BY *Clarence A O'Brien*
*and Harvey B. Jacobson*
Attorneys

United States Patent Office 3,167,199
Patented Jan. 26, 1965

3,167,199
SELF-UNLOADING TRUCK BODY
Oliver Pivert, Sr., 5101 Elysian Fields Ave.,
New Orleans, La.
Filed Dec. 22, 1961, Ser. No. 161,513
20 Claims. (Cl. 214—517)

The present invention generally relates to a truck body construction and more particularly to a mechanically operated dump truck with dischargeable boxes incorporating a single cable lift mechanism that is non-hydraulic and non-pneumatic thereby eliminating the high pressures incident to fluid pressure operated dump truck dischargeable boxes.

In recent years, there has been some development in the use of load carrying bodies or boxes which are detachable from a supporting framework so that one vehicle may be employed in conjunction with a plurality of such load carrying boxes whereby the entire load carrying box may be discharged from the vehicle and left at a designated point for a predetermined length of time thereby enabling the box to be unloaded or loaded with the box then being subsequently retrieved by the vehicle. The load carrying box preferably is of simple construction and yet rugged to withstand the abuse normally received during the use thereof but yet must be easily picked up by the vehicle and discharged therefrom.

Accordingly, it is the primary object of the present invention to provide a truck body or box together with a vehicular structure having novel coaction therewith whereby the truck body or box may be conveyed on the vehicle in the normal manner of a truck, elevated to a position for dumping articles from the truck body or box while maintaining the body on the vehicular frame or elevated to an intermediate position to enable discharge of the truck body or box from the vehicular frame or for picking up the truck body or box from a position resting on the ground surface or the like all of which is accomplished mechanically thereby eliminating high pressure piston and cylinder arrangements and accompaning flexible hoses and the like which are subject to considerable damage and rupture during normal use thereof.

Another object of the present invention is to provide a self-unloading truck body in accordance with the preceding object having a safety mechanism incorporated therein whereby the supporting frame for the truck body will be immediately locked in any angular position in the event of breakage of the lifting cable.

Another problem which must be overcome is the necessity of elevating the front of the body to an angular position sufficient to overcome the natural angle of repose of the material in the truck body. In order to accomplish this, a subframe is provided that is pivotally connected to the vehicular frame adjacent the rear thereof together with an elevator or lift frame pivotally attached to the forward end of the subframe and including rollers on the free end thereof engaging trackways of generally L-shaped configuration on the vehicular frame whereby the lift frame not only assists in the initial lifting of the truck body but extends the subframe to the angular position necessary to dump the material from the truck body.

Still another feature of the present invention is the provision of a cable lift mechanism combined with the subframe and lift frame assembly whereby the initial lift will be substantially in a vertical direction at the forward end of the subframe thereby greatly reducing the force necessary to lift the truck body such as occurs by using fulcrum elements and the like which are conventionally employed for this purpose, the lift frame subsequently receiving the force at the free end thereof whereby the rollers will move forwardly and up the generally L-shaped trackway for lifting the subframe to the desired angular position for dumping the contents of the truck body.

Still another important feature of the present invention is to provide a lock mechanism for locking the subframe in an intermediate angular position which is employed for discharging the truck body onto the ground surface or the like and for retrieving a truck body thereby enabling the winch mechanism to be employed for moving the truck body with the subframe locked in stationary inclined position.

Yet another object of the present invention is to provide a truck body in accordance with the various preceding objects having a structure which facilitates the guiding of the body in relation to the subframe during the discharge and pickup of the truck body or box together with latch means for locking the truck body on the subframe and an arrangement whereby the load carried by the truck body is transmitted directly to the vehicular frame.

With all of the foregoing objects in mind, the present invention still incorporates a relatively simple construction which is foolproof and safe in operation, dependable and long lasting, easy to operate and maintain and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throgout, and in which:

FIGURE 1 is a top plan view of the load carrying truck body of the present invention mounted on a truck or the like;

The truck body or box of the present invention is generally designated by the numeral 10 and it is supported from a vehicle frame generally designated by the numeral 12 by a subframe generally designated by the numeral 14. The subframe 14 is pivoted to the rear of the vehicle frame 12 by a pivot shaft 16 which extends transversely at the rear of the vehicle. The forward end of the subframe 14 is pivotally attached to a lift frame generally designated by numeral 18. The lift frame has rollers 20 at the free end thereof which rollingly engage an angulated trackway generally designated by the numeral 22 and which may be generally considered L-shaped with the bottom portion thereof inclined. A portion of the trackway 22 is supported by an upstanding winch frame generally designated by numeral 24 that may be located directly behind the truck operator's cab 26.

The structure of the truck vehicular structure may be varied but for purposes of description includes front steerable wheels 28 disposed under the cab together with rear driving wheels 30 which are driven in a suitable manner by a drive shaft 32 extending rearwardly from the transmission 34. The driving wheel structure 30 may be in the form of a tandem assembly and this portion of the structure of the vehicle forms no particular part of the present invention since any suitable vehicular structure may be employed. A suitable prime mover such as an internal combustion engine located under the cab in a suitable manner is connected to the transmission to a suitable clutch mechanism and also a suitable power take-off may be provided from the transmission or from the prime mover for operating a winch mechanism in a manner described hereinafter. For purposes of description, the vehicle frame 12 includes longitudinal rails 36 interconnected by transverse members 38. Upwardly extending and longitudinally disposed members 40 are disposed at each side of the vehicular frame 12 and forms supports for the transverse shaft 16 and the transverse shaft 16 also has a plurality of cylindrical rollers 42 mounted thereon which form a guide means for rollingly engaging the forward end of the truck body 10 in a manner described hereinafter.

The subframe 14 includes a pair of longitudinal rails 44 rigidly interconnected by transverse rails 46 thus forming a rigid subframe. Mounted on a transverse plate 48 adjacent the rear thereof is a pair of guide rollers 50 rotatable about a substantially vertical axis when the subframe 14 is in horizontal position. The plate 48 is located forwardly of the rear ends 52 of the frame rails 44 which are pivoted on the shaft 16. The rollers 50 each have a peripheral flange 54 at the top edge thereof whereby a lift cable may pass between the guide rollers 50 and be engaged with the truck body in a manner for pulling the truck body 10 onto the subframe.

The truck body 10 is of suitable configuration and may be of any desired size and includes a smooth interior provided by side walls 56, a front wall 58 and a bottom 60. The walls are reinforced by vertical structural members 62 attached to the exterior surface of the walls and having the ends thereof secured to outwardly extending flanges or reinforcement members 64 at the top and bottom edges of the walls respectively. The rear of the truck body 10 is provided with a pair of hingedly mounted gates 66 and 68 mounted for swinging movement about the outer edges thereof by suitable hinge mechanism 70. A latch mechanism 72 is provided for retaining the doors 66 and 68 in closed position. An operating handle 74 is provided for the latch mechanism 72 and by operating the handle 74 the latch members or rods 72 may be retracted from the keepers 76 in an obvious manner thereby enabling the endgates or tailgates to be pivoted to an open position. The particular construction of the tailgate or endgate structure may be varied and any suitable latch mechanism may be employed for retaining the doors or gates in closed position.

Figure 1:
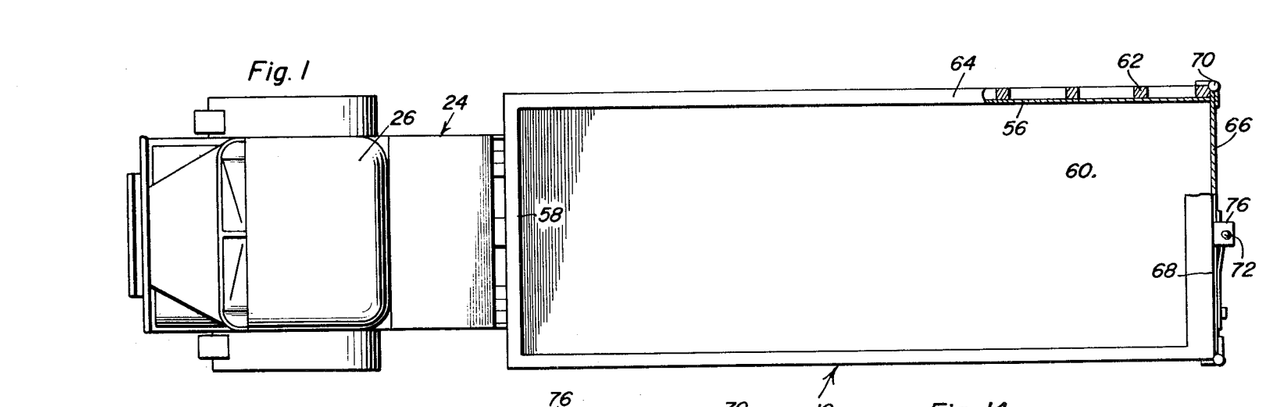
Figure 2:
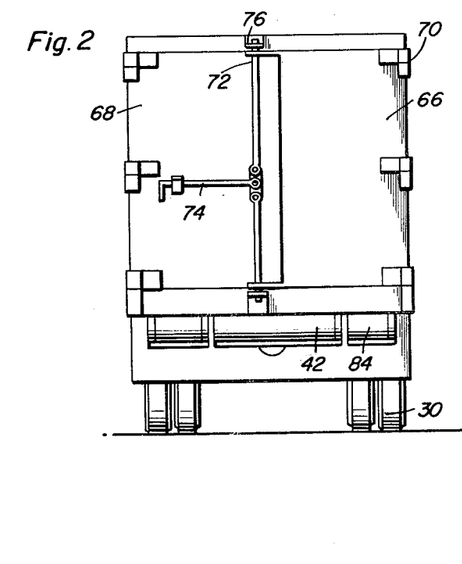
FIGURE 2 is a rear end view of the construction of FIGURE 1 illustrating the gate mechanism for the rear end of the truck body.
Figure 3:
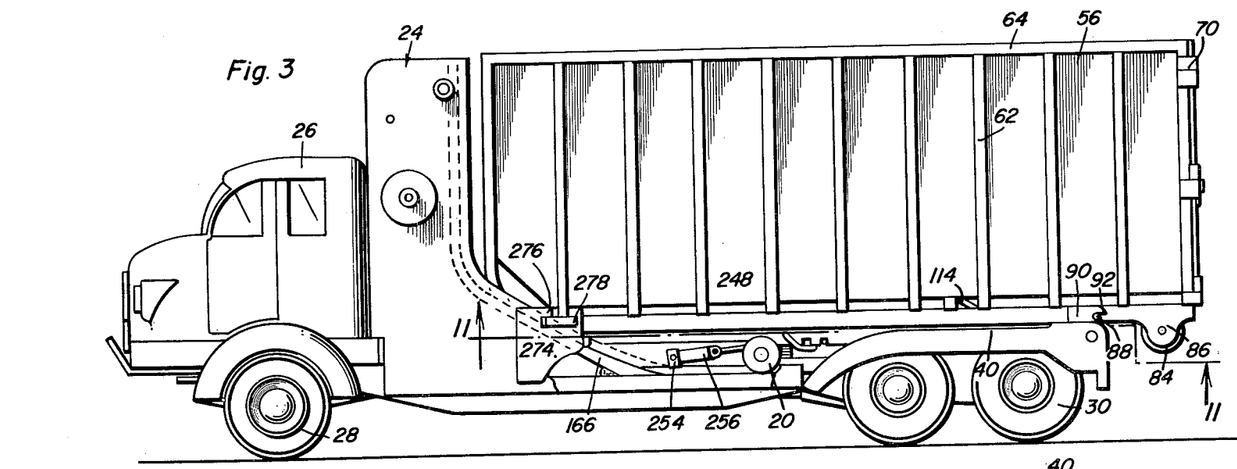
FIGURE 3 is a side elevational view of the truck body and truck assembly illustrating the relationship of component parts thereof.
Figure 4:
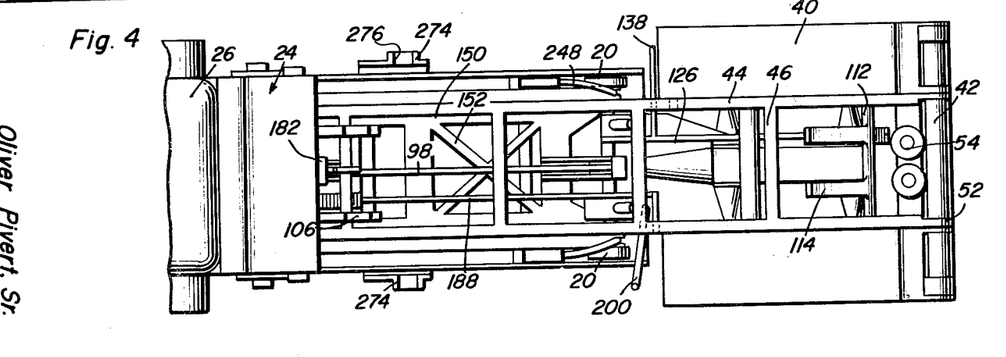
FIGURE 4 is a plan view of the vehicular frame, subframe and lift frame with the truck body removed therefrom.
Figures 11, 15, 16:
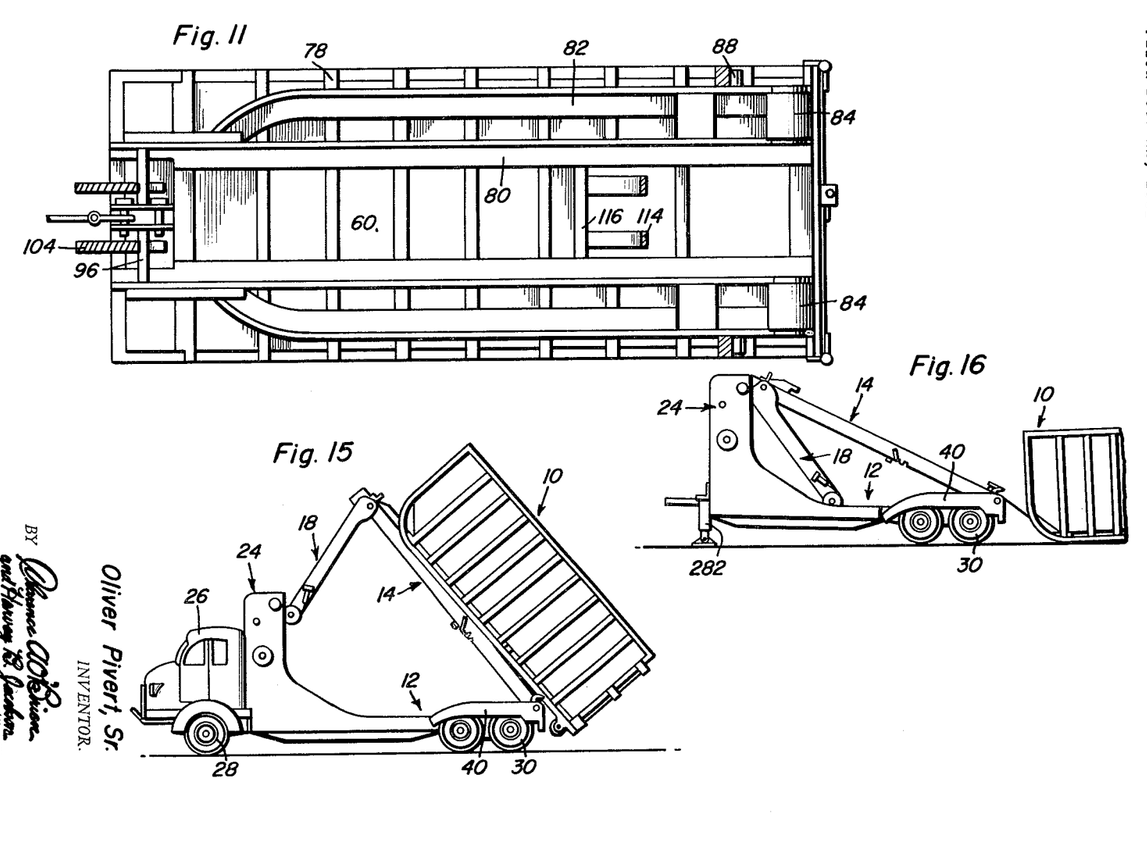
FIGURE 11 is a bottom plan view of the truck body taken substantially upon a plane passing along section line 11—11 of FIGURE 3 illustrating further structural details of the truck body and the relationship of the subframe thereto.
FIGURE 15 is a side elevational view of the vehicle illustrating the position for dumping the material from the truck body while retaining the truck body on the subframe.
FIGURE 16 is a side elevational view illustrating the position when the truck body is being discharged or picked up.
Figure 12:
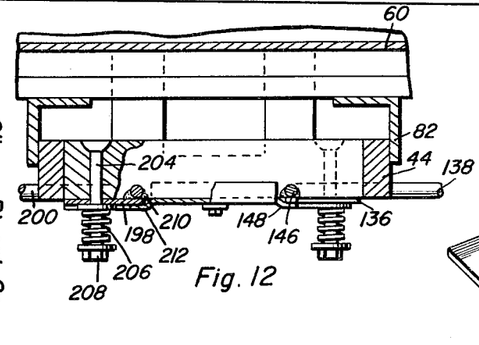
FIGURE 12 is a transverse, sectional view taken substantially upon a plane passing along section line 12—12 of FIGURE 8 illustrating the guiding relationship of the subframe and the truck body.
Figure 13:
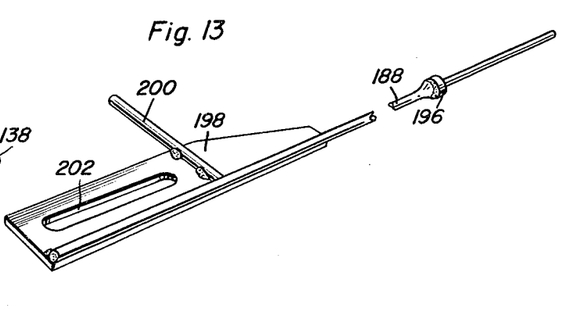
FIGURE 13 is a perspective view of one of the lock mechanisms for locking the subframe in angularly adjusted position.
Figure 14:
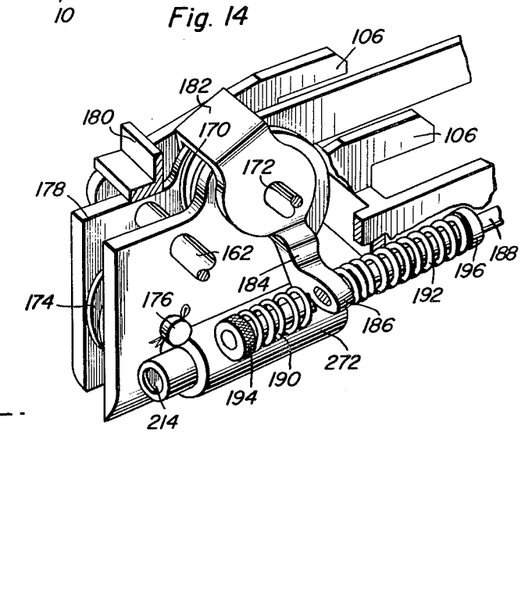
FIGURE 14 is a perspective view of the forward end of the subframe.

FIGURE 11 illustrates the bottom construction of the truck body which includes a plurality of transverse supporting rails 78 which reinforce the bottom 60. A pair of longitudinal rails 80 are attached to the transverse rails 78 and a second pair of longitudinal rails 82 are disposed outwardly of the rails 80 and have inwardly curved forward ends. The rear ends of the rails 80 and 82 journal a pair of large rollers 84 thereon which project below the bottom surface of the truck body for engaging a supporting surface such as a concrete dock surface or the like so that the rear end of the truck body will rollingly engage such a supporting surface. The orientation of the rollers 84 and the depending flanges 86 integral with the rails 80 and 82 provided for supporting the rollers 84 all are clearly shown in FIGURE 3. Also, the outer rails 82 have an outwardly projecting pin 88 thereon which engages an upstanding projection 90 on the vehicular frame in the form of a rearwardly projecting lug or hook 92 under which the pin 88 is engaged when the truck body is in position on the vehicular frame thereby preventing any upward movement or forward movement of the truck body in relation to the vehicular frame and retaining the truck body with the rails 80 and 82 resting on the top surface of the members 40 which form a portion of the vehicle frame.

The forward end of the body 40 is provided with a recess defined by an inclined wall portion 94 and a transverse shaft 96 extends between the forward ends of the frame rails 80. A lift cable or tow cable 98 is attached to the transverse shaft 96 by a suitable clevis connection 100 or by any other suitable means such as a detachable hook connection or the like. The clevis connection may be adjustable in relation to the truck body to vary the position of attachment of the cable 98 to a certain extent. A transverse plate 102 is provided at the forward end of the body and the lower corner thereof is provided with rounded ribs or skid members 104 for engagement with the roller structure 42 on the vehicular frame. When the body 40 is in the forwardmost position, the transverse plate 102 is engaged with hook-like lugs 106 rigid with the vehicle frame in order to lock the forward end of the body from upward movement or forward movement in relation to the subframe.

Figure 8:
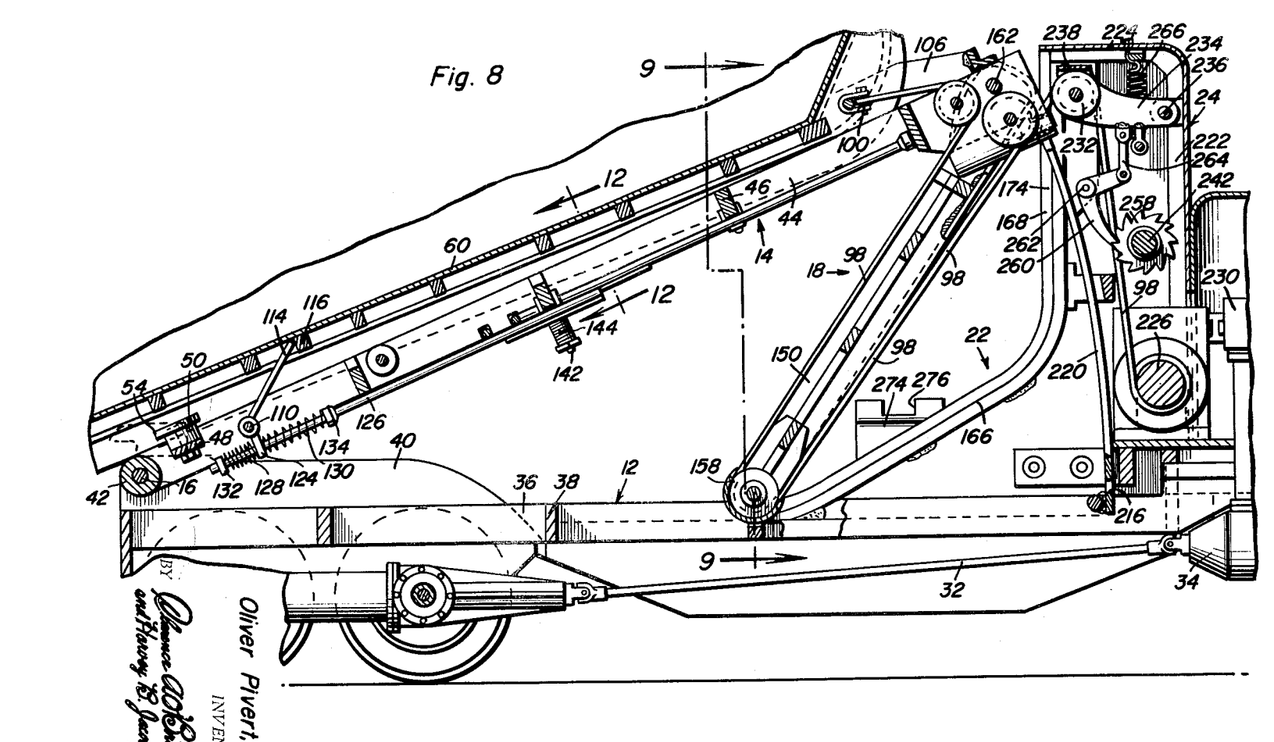
FIGURE 8 is a longitudinal sectional view illustrating the structure and relationship of the vehicle frame, the subframe and lift frame together with the trackway for the lift frame and illustrating the structure in a position for loading or unloading the load carrying body.
Figure 9:
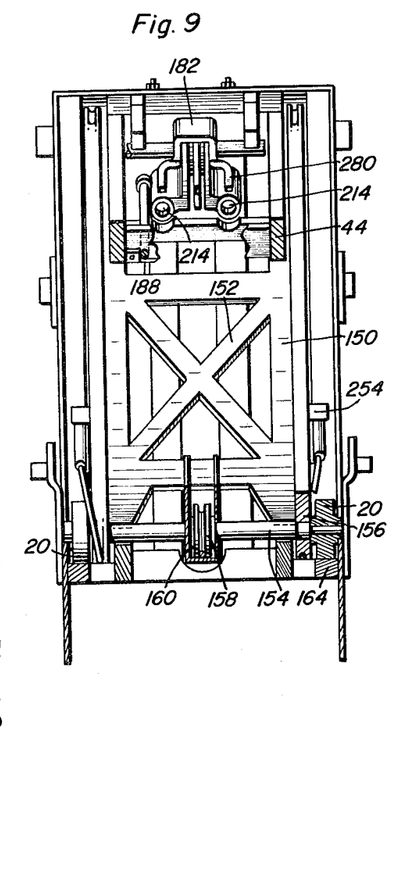
FIGURE 9 is a transverse, sectional view taken substantially upon a plane passing along section line 9—9 of FIGURE 8 illustrating further structural details of the lift frame and the relation thereof to the remainder of the structure.
Figure 10:
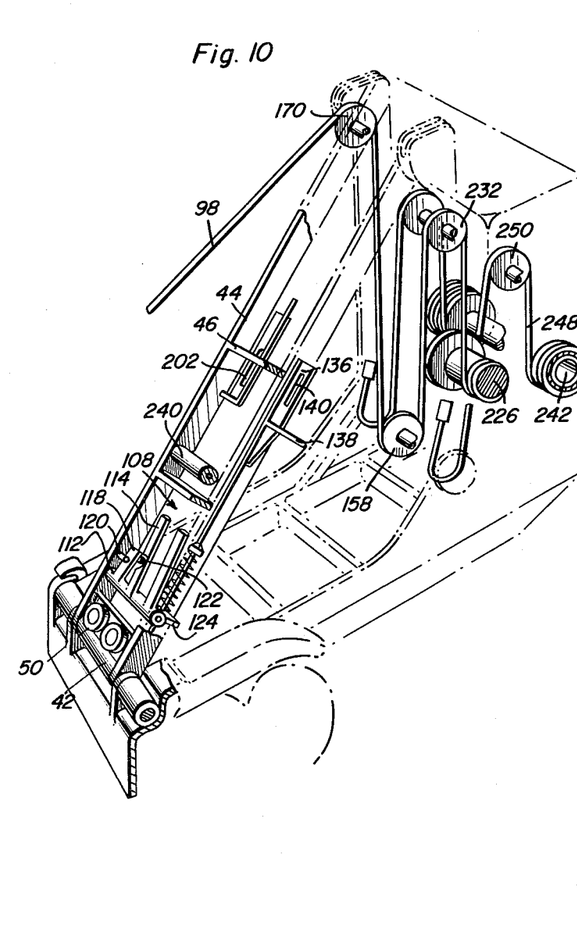
FIGURE 10 is a schematic perspective view illustrating the passage of the lift cable and the relationship of the structural components.

A latch mechanism generally designated by numeral 108 is provided for engaging the body 10 and preventing rearward movement thereof in relation to the subframe 14. The latch mechanism includes a transverse shaft 110 extending between the beams or rails 44 of the subframe 14. A sleeve 112 is journaled on the shaft 110 and includes a pair of elongated parallel lock arms 114 having the free ends thereof extending forwardly and adapted to engage behind a transverse keeper bar 116 carried by the body 10 as illustrated clearly in FIGURE 8. One end of the sleeve 112 is provided with an offset arm 118 engageable with stop pins 120 and 122 for limiting the swinging movement of the lock arms 114. The other end of the sleeve 112 is provided with a depending offset arm 124 which is apertured and which receives an operating rod 126 therethrough. The operating rod 126 is longitudinally movable on the subframe and includes springs 128 and 130 which engage opposite sides of the arm 124. Abutment members 132 and 134 are disposed on the rod 126 in spaced relation to the arm 124 whereby the lock arms 114 will be normally spring urged to an upwardly inclined position in relation to the subframe as illustrated in the condition of FIGURE 8 in which event the rod 126 is in its forwardmost position. When the operating rod 126 is moved rearwardly, the spring 130 will be compressed while the spring 128 will be extended thus urging the arm 124 rearwardly for urging the lock arms 114 in parallel relation to the subframe thus releasing the free ends thereof from the transverse member 116. Thus, when the body is moved slightly forwardly, the lock arms 114 are released when the operating rod 126 is moved rearwardly. The lock arms 114 are for safety purposes and will prevent the rearward movement of the body 10 off of the subframe 14 until such time as the rod 126 has been moved rearwardly to a released position. The spatial relationship of the lock arms 114 and the transverse keeper bar 116 is such that the lock arms 114 may be swung downwardly when the body 10 is in its forwardmost position thus enabling the rod 126 to be actuated for withdrawing the lock arms 114 and enabling the body to be discharged from the subframe. As the body is moved onto the subframe, the various transverse rails 78 on the body will effectively act as keeper bars in order to immediately prevent the body from rolling rearwardly off of the subframe in the event the lift cable 98 breaks.

Figure 5:
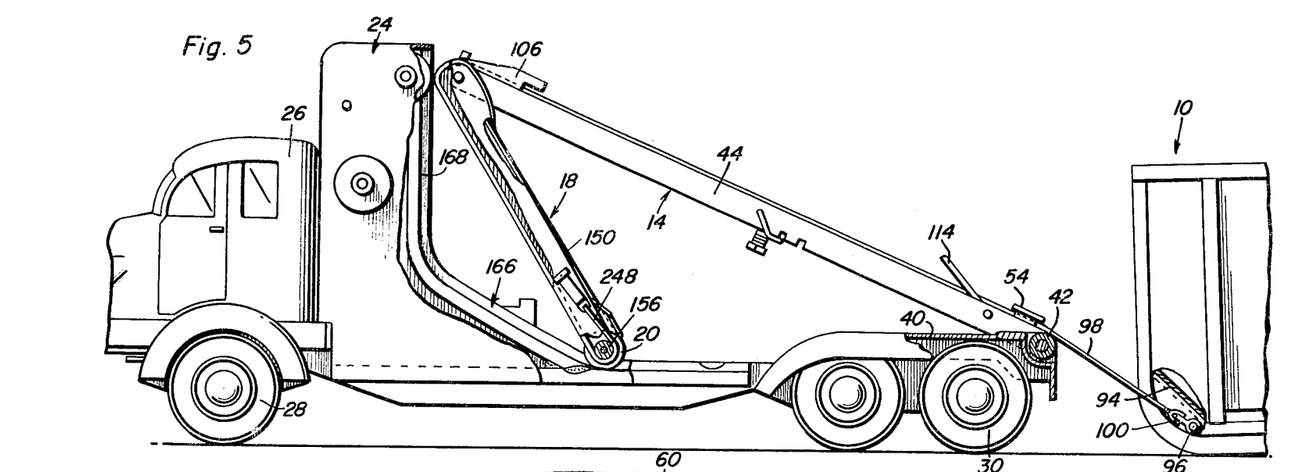
FIGURE 5 is a side elevational view, with portions broken away, illustrating the subframe locked in an intermediate position for either picking up or discharging the truck body with the forward end of the truck body being ilustrated in desired position in alignment with the subframe.

For retaining the operating rod 126 in adjusted position, the forward end of the rod 126 is provided with a laterally extending plate 136 and also a laterally extending handle 138 for manipulation of the rod 126. The plate 136 has a longitudinal slot 140 therein which receives a fastening bolt or rod 142 having a compression spring 144 mounted thereon whereby the compression spring 144 will frictionally engage the undersurface of the plate 136 thus frictionally holding it against the undersurface of the subframe. The rod 126 may be journaled in a suitable recess 146 in the subframe and a guide member 148 may engage around one edge of the plate 136 thus mounting the plate for longitudinal sliding movement on the subframe 14. Thus, the laterally extending handle 138 may be moved longitudinally for operating the rod 126 thereby urging the lock arms 114 to a parallel relation to the subframe 14 or to a spring biased upwardly inclined relation as illustrated in FIGURE 5 whereby the lock arms will serve as a safety lock when the body is being pulled onto the subframe and also serve as a retainer for preventing any substantial rearward movement of the truck body during transport thereof.

The lift frame 18 has a pair of side rails 150 interconnected by diagonal and transverse brace members 152 thus forming a rigid framework having a transverse shaft 154 at the free end thereof which projects outwardly beyond the rails 150 and which journals the rollers 20 on the outer ends thereof. Journaled inwardly of the rollers 20 is a pair of pulleys or sheaves 156. Also, the shaft 154 has a centrally disposed pulley or sheave 158 mounted thereon and the sheave 158 is provided with a guard 160 for retaining the lift cable 98 therein. The upper ends of the rails 150 are connected to the subframe 14 by virtue of a transverse shaft 162. The shaft 162 thus forms a pivotal connection between the subframe 14 and the lift frame 18.

The rollers 20 roll on the trackways 22 which are in the form of ledges 164 rigidly affixed to the vehicular frame at the bottom edge thereof and the winch frame 24 at the top thereof. The tracks or ledges 164 have an upwardly inclined lower portion 166 and a vertically extending upper portion 168 whereby the ledge 164 which has a horizontal component at the lower end thereof which receives the rollers when the lift frame 18 is in horizontal position provides a guide for movement of the lower or free end of the lift frame from its rearmost position forwardly and upwardly to a position in which the lift frame extends substantially upwardly from the top end of the trackway 22 as illustrated in FIGURE 15.

The forward end of the subframe is provided with a pulley or sheave 170 mounted on a shaft 172 and also a pulley 174 mounted on a shaft 176. The shaft 172 and shaft 176 are supported by longitudinal plate members 178 interconnected by transverse reinforcement 180. The pulley 170 is provided with a generally U-shaped guard 182 which has a depending portion 184 provided with an outstanding apertured lug 186 slidably receiving a locking rod 188 which extends longitudinally of the subframe 14 and includes a coil spring 190 thereon engaging one side of the lug 186 and a coil spring 192 on the opposite side thereof engaging the opposite surfaces of the lug 186. Abutments 194 and 196 are rigidly affixed to the rod 118 for urging the rod longitudinally of the subframe. The rear end of the rod 188 is provided with a plate 198 extending laterally therefrom and also an operating handle 200. The plate is provided with a slot 202 slidably receiving a fastener 204 extending therethrough and provided with a spring 206 and a retaining nut 208 or the like thus frictionally retaining the plate 198 in longitudinally adjusted position. The handle 200 enables the rod 188 to be longitudinally moved and the rod 188 and the plate 198 are slidingly guided by virtue of a recess 210 and a guide member 212 all of which may be substantially similar to the construction for guiding the operating rod 126. While mechanical or manual means has been shown for operating the rods, such lock devices may be operated electrically, pneumatically or hydraulically if desired since there is not too much power required for moving the operating rods.

The forward end of the operating rod 188 is connected with a longitudinally slidable lock pin 214 which is engageable with either a bottom aperture 216 or a top aperture 218 in a curved guide bar 220 that is rigid with the winch frame 24 and which is curved generally on the arc defined by a center about the transverse shaft 16 at the rear of the subframe thus enabling the subframe to be locked in a lowered position or to be locked in an intermediate inclined position as illustrated in FIGURE 8 with the forward end of the subframe being rigidly fixed to the upstanding winch frame thereby forming a positive support for the subframe during the discharge of the truck body or box or during pickup of the truck body or box.

The winch frame 24 is provided with upstanding support frame members 222 and an external covering or housing 224. Mounted adjacent the bottom of the winch frame 24 is a winch drum 226 supported in any suitable manner from supporting members 228. The winch drum is driven from a suitable power source such as a power take-off adapter 230 connected with the transmission 34 in a known manner. The lift cable 98 is wound on the winch drum 226 and extends upwardly therefrom and over a pulley or sheave 232 supported by a forwardly extending arm 234 pivotally supported from the housing 224 or the framework 222 by a pivot pin 236 whereby the support arm 234 may swing vertically but cannot move downwardly beyond a certain point. A guard 238 is provided for the pulley 232 over which the cable 98 is entrained. The cable 98 extends downwardly and rearwardly under the pulley or sheave 174 at the forward end of the subframe when the subframe is in horizontal or inclined position as illustrated in FIGURE 8. The cable 98 then extends longitudinally along the undersurface of the subframe 18 and around the central pulley 158 thereon and then forwardly along the upper surface of the subframe and over the top pulley 170 on the subframe and thence along the top surface of the subframe to connection with the load carrying body by virtue of the clevis connection or other suitable connection 100 as defined previously. The subframe 14 may be provided with a transverse roller 240 intermediate the length thereof for engaging the cable 98 when pulling the truck body onto the subframe or when discharging the truck body to prevent chafing of the cable.

Also, supported on the winch frame is a rotatable winch shaft 242 having a pair of winch drums 244 and 246 thereon each receiving a safety cable 248 which are entrained over pulley 250 and 252 respectively at the upper end of the winch frame. The cables 248 then extend downwardly and under the outermost pulleys 156 on the lift frame 18 and are anchored to the side rails 150 thereof by anchor brackets 254 and including a spring loaded anchor sleeve 256 to provide some resiliency to the cables 248. The central portion of the shaft 242 is provided with a ratchet wheel 258 which is engaged by a bellcrank pawl or dog 260 pivoted on pivot pins 262 and having the other end thereof connected to the pivotal arm 234 by a connecting link 264. Thus, downward movement of the arm 234 releases the pawl 260 from the ratchet gear 258 thus enabling rotation thereof in a normal manner so that the lift frame and subframe may be lowered in a normal manner. However, should the lift cable 98 suddenly break, the arm 234 would move upwardly thus pivoting the pawl 260 into engagement with the ratchet 258 thereby locking the shaft 242 from rotation thereby preventing outward linear movement of the cables 248 thereby preventing the lift frame from moving downwardly thus supporting the subframe and truck body in any position if the cable 98 breaks. The arm 234 is urged upwardly by a spring 266 having one end thereof attached to the frame or housing 224 and having the other end attached to a shaft 268 extending under the arm 234. This construction provides a safety device which will provide an instant stopping means for the subframe in the event the lifting cable 98 is broken.

Figures 6, 7:
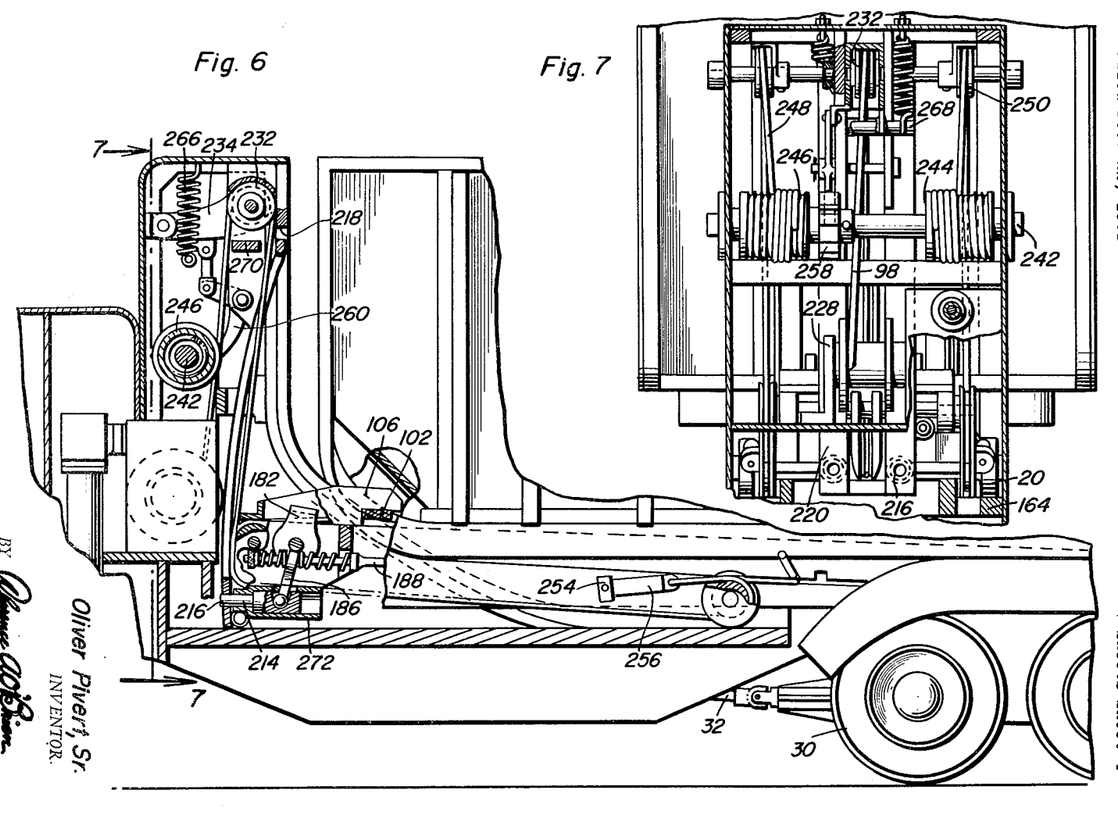
FIGURE 6 is a detailed sectional view of the winch mechanism and the safety drum together with the manner in which the lift cable passes over the sheaves.
FIGURE 7 is a detailed sectional view taken substantially upon a plane passing along section line 7—7 of FIGURE 6 illustrating further structural details of the winch mechanism and the related pulleys and safety device.

Referring now specifically to FIGURE 6, the transverse supporting plate 270 which supports the forward end of the supporting arm 234 in a normal position is illustrated as is the orientation of the spring 266 which urges the arm 234 upwardly in the event the cable 98 is broken. Also, FIGURE 6 illustrates the specific construction of the locking pin 214 which is slidable in a sleeve-like cylinder 272 which has connection with the pivotal lug 186 which surrounds the operating rod 188 whereby longitudinal movement of the operating rod 188 will effect longitudinal retraction or extension of the locking pin 214 for engagement with either the lower aperture 216 as illustrated in FIGURE 6 or the upper aperture 218.

Also, an upstanding support member 274 having a recess 276 on the upper end thereof is provided on the vehicle frame 12 for engagement with lateral projecting support members 278 carried by the subframe 14 thereby supporting the forward end of the subframe and due to the structure of the recess 276, the subframe cannot shift longitudinally in relation to the vehicular frame thereby relieving the pivot shaft 16 from supporting the load during transport of the truck body.

The guard 182 is pivoted along with the lug 186 and the opposite side of the guard is provided with an arm 280 for operating a similar lug and locking pin on the opposite side thereof. The forward ends of the plates 178 are guidingly related to the guide member 220 and they also serve to guide the lifting cable. An extensible jack or support 282 is provided for the forward end of the vehicular frame thus enabling the device to be used in the form of a trailer or the like.

The drums 246 are spring loaded to continuously wind the cables 248 thereon to prevent any slack from accumulating in such cables. Thus, at any time the cable 98 may become broken, the latch pawl 260 will engage the ratchet gear 258 thus supporting the subframe by virtue of the cables 248 passing around the pulleys 156 and being anchored to the lift frame 18.

In operation of the device, the truck body 10 may be dumped by operating the winch mechanism to exert tension on the cable 98. Assuming that the body 10 is in a horizontal position, the latch pins 214 must first be released from the bottom aperture in which they are normally inserted during transport. Then upon winding of the winch drum, the initial lifting force exerted by the cable 98 will be in a true vertical position on the pulley at the forward and bottom surface of the subframe 14. Then as the subframe is pivoted upwardly, the rollers 20 will follow the trackway 22 and the tension on the cable 98 will be then transmitted to the pulley at the rear and bottom end of the lift frame 18 thus pulling the lift frame 18 forwardly and upwardly while the rollers 20 maintain engagement with the trackway 22. This operation will continue until such time as the lower end of the lift frame is generally in alignment with the pulley 232 at the upper end of the winch frame 24. In this position, the subframe 14 is disposed with the forward end thereof spaced completely above the vehicle and the material in the truck body 10 may be easily dumped by opening the rear gates, tailgate or whatever mechanism is used at the openable end thereof inasmuch as the angle to which the truck body is lifted is greater than the natural angle of repose of any material disposed in the truck body. Thus, the truck body may be used in the nature of a conventional dump truck for use wherever desired to dump a load.

If it is desired to discharge the truck body onto a supporting surface such as a concrete decking or other surface equivalent thereto, the lifting operation of the subframe is repeated except that the lock pins 214 after being initially released from the lower aperture in which they are normally engaged during transport will be again pushed forwardly and will be spring urged forwardly as they ride along the inner surface of the guide 220. Then when they reach the upper aperture, the lock pins 214 would automatically be engaged therewith thus locking the subframe in an intermediate position generally with the forward end thereof in alignment with the top pulley 232 on the winch frame. In this position, the subframe 14 is locked in position and after the body is released from the subframe by releasing the lock arms 114, the winch mechanism may be operated to release or pay out the cable 98 whereby the truck body 10 may then slide off of the subframe by engagement of the truck body with the rollers on the subframe. The rollers at the rear of the truck body engage the supporting surface on which the truck body is to be rested and due to the inclination of the subframe, the truck body will roll gradually off of the subframe as the cable 98 is payed off of the winch drum. The arcuate curved forward end of the truck body and the orientation of the cable 98 between the rollers 50 and over the rollers 42 enables the forward end of the truck body to be gently lowered to the ground or concrete supporting surface after which the cable 98 may be disconnected from the body and the cable 98 attached to any suitable point on the subframe so that upon release of the lock pins 214, the subframe may be lowered to a horizontal position for over the road transport.

When picking up the truck body 10, the above procedure is reversed in that the truck is backed into position generally in alignment with the truck body which is resting on a supporting surface and the subframe is elevated to the intermediate inclined position and locked in this position by virtue of the lock pins 214 engaging the upper aperture in the guide 220. The cable 98 is then payed out from the winch and connected to the forward end of the truck body 10. Then, by winding the cable back onto the winch drum, the truck body 10 will be pulled towards the vehicle and will actually become aligned therewith since the cable will be disposed between the rollers 50. In other words, if one corner of the truck body engages the rear plate and roller assembly on the rear end of the vehicle prior to the other front corner, the tension exerted by the cable 98 will tend to pull the body into alignment with the subframe. This is especially true as the cable 98 lifts the forward end of the body up off of the ground while it is in engagement with the rollers 42 and while it is rolling over the rollers 42 so that the longitudinal rails on the truck body will guidingly engage the subframe and be guided thereon. The lock arms 114 will engage with the transverse keeper bars such as 116 as the truck body moves onto the subframe and the body engages with the hooks at the forward end of the subframe and with the hooks at the rear end of the vehicular frame thus locking the truck body in position thereon. Then, by releasing the lock pins 214 and paying out the cable 98, the forward end of the subframe and the body locked thereto will be lowered to a horizontal transport position.

If at any time during raising and lowering of the subframe and body the cable 98 should break, then the safety cables 248 will effectively support the body and the subframe in its elevated position due to the ratchet and pawl mechanism and the spring loaded support arm 234 for the pulley 232. Also, the reels or drums for the safety cables 248 maintain the cables taut at all times and enable swinging movement of the lift frame 18. Any suitable control mechanism may be provided for operating the winch drum from the cab of a vehicle or the controls may be operated from any suitable position. While the device has been illustrated on a truck having a straight bed, it could also be incorporated into trailer structures as desired. One use contemplated for the present invention is the provision of the truck body as a trash container so that it may be left in an industrial plant or the like and when filled or at periodic intervals, an empty truck body may be discharged and the full one picked up and taken to a dump area and dumped and the then empty truck body may be taken to the next location. Many other uses of the present invention will be readily apparent and the advantages, safety factors involved also will be readily appreciated from a consideration of the mechanical features involved which may have adequate lubrication means and sizes as required by the particular loads encountered.

The foregoing is considered as illustrative only of the principles of the invention. Further, since numerous modifications and changes will readily occur to those skilled in the art, it is not desired to limit the invention to exact construction and operation shown and described, and accordingly all suitable modifications and equivalents may be resorted to, falling within the scope of the invention as claimed.

What is claimed as new is as follows:

1. A truck body assembly comprising a mobile vehicle frame, an elongated subframe overlying the vehicle frame, means pivotally connecting the rear end portion of the subframe to the rear end portion of the vehicle frame whereby the subframe may swing in a vertical plane about substantially a transverse horizontal axis, a lift frame, means pivotally connecting one end of the lift frame to the forward end of the subframe, a trackway mounted on said vehicle frame at the forward end thereof, means on the other end of the lift frame guidingly engaging said trackway whereby the lift frame may swing in a vertical plane and move between a position underlying the subframe and overlying the vehicle frame to a positon generally perpendicular to the subframe for lifting the subframe to an elevated position, a truck body, means removably mounting the truck body on the subframe for swinging movement therewith and for discharge of the truck body from the truck frame, a lift cable attached to the truck body, extending longitudinally of the subframe, longitudinally of the lift frame and around the end of the lift frame engaging the trackway, and winch means for winding the cable or paying out the cable thereby enabling the subframe to be pivoted in a vertical plane and enabling the truck body to be discharged from the subframe or pulled onto the subframe by actuating the winch means.

2. The structure as defined in claim 1 together with a lock means interconnecting the forward end of the subframe and the vehicle frame for locking the subframe in a horizontal transport position or an upwardly inclined position for discharging the truck body or for pulling the truck body back onto the subframe.

3. The structure as defined in claim 2 wherein said subframe includes spring urged lock arms adjacent the rear thereof for engagement with a transverse keeper bar on the truck body for retaining the truck body on the subframe, said lock arms including actuating means for retraction thereof.

4. The structure as defined in claim 3 wherein said winch means is mounted in a vertically disposed winch frame rigid with the vehicle frame, said lift cable passing over a top pulley on the winch frame whereby the initial movement of the cable will exert an upward force on the forward end of the subframe after which force will then be transmitted to the free end of the lift frame for moving the free end of the lift frame along the trackway thereby elevating the forward end of the subframe to a position above the top end of the trackway.

5. The structure as defined in claim 4 wherein said truck body includes an open top container, roller members at the rear bottom corner of the container for engaging a supporting surface when the truck body is being discharged from or pulled onto the inclined subframe.

6. The structure as defined in claim 5 wherein said truck body includes longitudinal rails having depending outer flanges, said subframe having longitudinal rails received between the depending flanges on the truck body thereby aligning the truck body with the subframe.

7. The structure as defined in claim 6 wherein said subframe includes a pair of rearwardly opening hooks, said truck body having a transverse bar engageable under the hooks when the truck body is pulled to its forwardmost position, said vehicle frame having support means for engaging the subframe when the subframe is lowered thereby supporting the subframe and truck body, said means on the vehicle frame including recesses to prevent longitudinal movement of the subframe and truck body in relation thereto.

8. A truck body assembly comprising a mobile vehicle frame, an elongated subframe overlying the vehicle frame, means pivotally connecting the rear end portion of the subframe to the rear end portion of the vehicle frame whereby the subframe may swing in a vertical plane about substantially a transverse horizontal axis, a lift frame, means pivotally connecting one end of the lift frame to the forward end of the subframe, a trackway mounted on said vehicle frame at the forward end thereof, means on the other end of the lift frame guidingly engaging said trackway whereby the lift frame may swing in a vertical plane and move between a position underlying the subframe and overlying the vehicle frame to a position generally perpendicular to the subframe for lifting the subframe to an elevated position, a truck body, means removably mounting the truck body on the subframe for swinging movement therewith and for discharge of the truck body from the truck frame, a lift cable attached to the truck body, extending longitudinally of the subframe, longitudinally of the lift frame and around the end of the lift frame engaging the trackway, winch means for winding the cable or paying out the cable thereby enabling the subframe to be pivoted in a vertical plane and enabling the truck body to be discharged from the subframe or pulled onto the subframe by actuating the winch means, lock means interconnecting the forward end of the subframe and the vehicle frame for locking the subframe in a horizontal transport position or an upwardly inclined position for discharging the truck body or for pulling the truck body back onto the subframe, said subframe including spring urged lock arms adjacent the rear thereof for engagement with a transverse keeper bar on the truck body for retaining the truck body on the subframe, said lock arms including actuating means for retraction thereof, said winch means being mounted in a vertically disposed winch frame rigid with the vehicle frame, said lift cable passing over a top pulley on the winch frame whereby the initial movement of the cable will exert an upward force on the forward end of the subframe after which force will then be transmitted to the free end of the lift frame for moving the free end of the lift frame along the trackway thereby elevating the forward end of the subframe to a position above the top end of the trackway, said truck body including an open top container, roller members at the rear bottom corner of the container for engaging a supporting surface when the truck body is being discharge from or pulled onto the inclined subframe, said truck body including longitudinal rails having depending outer flanges, said subframe having longitudinal rails received between the depending flanges on the truck body thereby aligning the truck body with the subframe, said subframe including a pair of rearwardly opening hooks, said truck body having a transverse bar engageable under the hooks when the truck body is pulled to its forwardmost position, said vehicle frame having support means for engaging the subframe when the subframe is lowered thereby supporting the subframe and truck body, said means on the vehicle frame including recesses to prevent longitudinal movement of the subframe and truck body in relation thereto, the end portion of the lift frame remote from the subframe being provided with a pair of safety cables, said safety cables extending over the winch frame, said winch frame including a spring urged drum receiving the safety cables whereby the safety cables will be always taut, a ratchet gear rigid with the spring urged drum, a pawl engageable with the ratchet gear for preventing unwinding rotation of the spring urged drum.

9. The structure as defined in claim 8 wherein said pawl is connected to a swingable arm carried by the winch frame, said swingable arm carrying the top pulley on the winch frame which receives the lift cable whereby breakage of the lift cable will enable movement of the swingable arm thereby rendering the pawl effective whereby the safety cables will hold the lift frame in its position thereby preventing the truck body and subframe from falling in the event of breakage of the lift cable.

10. In a dumpable vehicular body assembly, the combination of a subframe attached to a vehicular frame at the rear end thereof for swinging movement, a lift arm pivotally attached to the subframe at the forward end thereof and normally disposed between the subframe and the vehicle frame with the free end thereof disposed rearwardly of the pivotal connection between the lift arm and subframe, a trackway rigidly carried by the vehicle frame and including an upwardly extending portion and a horizontally extending portion, roller means on the free end of the lift arm engaging with the trackway, a lift cable entrained over a pulley disposed above the upper end of the trackway, said cable extending downwardly and rearwardly around the free end of the lift arm, longitudinally of the lift arm and around the pivotal connection between the lift arm and subframe, the pivotal connection between the lift arm and subframe being disposed adjacent the trackway when the subframe is in horizontal position whereby the initial force exerted on the lift cable will be in a vertical direction for lifting the forward end of the subframe in a vertical direction after which the force will be exerted on the free end of the lift arm for pulling the lift arm forwardly and upwardly along the trackway for elevating the subframe to its uppermost position thereby enabling the greatest lifting force to be exerted in a single vertical component when the subframe is initially lifted from its horizontal position.

11. The structure as defined in claim 10 wherein said trackway terminates at a vertically elevated position adjacent an uppermost pulley guiding the lift cable whereby the subframe may be elevated with the forward end thereof at an elevation above the uppermost cable pulley thereby elevating a vehicle load carrying body attached to the subframe to a position for dumping material out of the vehicle body.

12. In a vehicle having a pivotal load body and a lift cable for raising and lowering the body and including a topmost pulley over which the lift cable is entrained, a pivotal arm supporting the topmost pulley, a transverse support member limiting the downward movement of the pivotal arm, spring means urging the arm upwardly away from the transverse support, a safety cable connected with the pivotal load body, a spring wound winch drum for said safety cable, a ratchet gear rigid with the winch drum, a pawl engageable with the ratchet gear, and means connecting the pawl with the pivotal arm whereby the pawl will be rendered effective to engage the ratchet gear and stop unwinding movement of the drum and safety cable in the event of breakage of the lift cable with the spring moving the pivotal arm and the topmost pulley upwardly when the lift cable breaks or otherwise becomes relieved of its load.

13. A truck body assembly comprising a mobile vehicle frame, an elongated subframe overlying the vehicle frame, means pivotally connecting the rear end portion of the subframe to the rear end portion of the vehicle frame whereby the subframe may swing in a vertical plane about substantially a transverse horizontal axis, a lift frame, means pivotally connecting one end of the lift frame to the forward end of the subframe, a trackway mounted on said vehicle frame at the forward end thereof, means on the other end of the lift frame guidingly engaging said trackway whereby the lift frame may swing in a vertical plane and move between a position underlying the subframe and overlying the vehicle frame to a position generally perpendicular to the subframe for lifting the subframe to an elevated position, a truck body, means removably mounting the truck body on the subframe for swinging movement therewith and for discharge of the truck body from the subframe, a lift cable attached to the truck body, extending longitudinally of the subframe, longitudinally of the lift frame and around the end of the lift frame engaging the trackway, winch means for winding the cable or paying out the cable thereby enabling the subframe to be pivoted in a vertical plane and enabling the truck body to be discharged from the subframe or pulled onto the subframe by actuating the winch means, said winch means being mounted on a vertically disposed winch frame rigid with the vehicle frame, a top pulley mounted on said winch frame, said lift cable passing over the top pulley, a safety cable connected with the lift frame, a safety cable drum mounted on said winch frame, spring means urging said drum to continuously takeup the safety cable for retaining the safety cable in taut condition, a ratchet gear rigid with said drum, pawl means engageable with the ratchet gear, and means interconnecting the top pulley and the pawl for rendering said pawl effective in the event the lift cable breaks.

14. The structure as defined in claim 13 wherein said top pulley is carried by a swingable arm mounted on said winch frame, a stationary support for limiting the downward movement of the swingable arm, said arm being spring biased upwardly whereby the arm and top pulley will move upwardly upon breakage of the lift cable, said pawl being connected with the swingable arm for movement into engagement with the ratchet gear upon upward movement of the swingable arm thereby engaging the pawl with the ratchet gear upon breakage of the lift cable whereby the safety cable will hold the lift frame in its position for preventing the truck body and subframe from falling in the event of breakage of the lift cable.

15. The structure as defined in claim 13 wherein said subframe includes spring urged lock means adjacent the rear thereof for engagement with the truck body for releasably retaining the truck body on the subframe, and actuating means for retraction of said lock means for releasing the truck body when desired.

16. The structure as defined in claim 13 wherein lock means interconnects the forward end of the subframe and the vehicle frame for releasably locking the subframe in a horizontal transport position and in an upwardly inclined position for discharging the truck body or pulling the truck body back onto the subframe, said truck body including an open top container, roller members at the rear bottom corners of the container for engaging a supporting surface when the truck body is being discharged from or pulled onto the subframe, cooperating means on the subframe and truck body for guiding the truck body in relation to the subframe, roller means on the rear of the subframe for guiding and engaging the lift cable when it is used to pull the truck body when the forward end of the truck body is engaged with the rear end of the subframe when the truck body is being pulled onto the subframe.

17. In a load carrying vehicular body assembly, the combination of a vehicular frame, a sub-frame pivotally attached to the vehicular frame at the rear thereof for swinging movement in a vertical plane, lift frame means pivotally attached to the subframe adjacent the forward end thereof and normally disposed between the subframe and the vehicular frame with the free end thereof disposed rearwardly of the connection between the lift frame means and the subframe, trackway means rigidly carried by the vehiclular frame and including an upwardly extending portion and a horizontally extending portion, said lift frame means including roller means on the free end thereof for engagement with the trackway means, cable means entrained over a pulley disposed adjacent the upper end of the trackway means and extending longitudinally under the lift frame means, around the free end thereof, longitudinally above the lift frame means, and entrained over pulley means at the forward end of the subframe, a load carrying truck body mounted on the subframe, said cable means being terminally attached to the forward end of the load carrying body for enabling load discharge of the load carrying body and pulling of the load carrying body back onto the subframe when the subframe is orientated in an inclined position, winch means for said lift cable means, pulley means at the forward end of the lift frame means under which the lift cable means extends when the lift frame means is substantially in horizontal position whereby the initial force exerted on the subframe will be in substantially vertical position after which the force will be exerted on the free end of the lift frame means for causing the free end of the lift frame means to move along said trackway means for guiding the free end of the lift frame means during longitudinal and vertical movement thereof.

18. The combination as defined in claim 17 wherein said subframe includes releasable latch means for securing the subframe in its lowermost position for enabling transport of the assembly, said vehicular frame including a keeper at an elevated position for engagment by said latch means on the subframe for locking the subframe in an inclined elevated position for enabling the lift cable means to be extended and retracted without changing the position of the subframe for discharging the truck body from the subframe and pulling the truck body onto the subframe.

19. The combination as defined in claim 17 wherein said trackway means extends vertically above the vehicular frame a distance generally approximating the height of the truck body whereby the free end of the lift frame means may proceed to a point adjacent the upper end of the trackway means thereby elevating the forward end of the subframe above the upper end of the trackway means a distance generally equal to the length of the lift frame means for elevating the truck body to an angle of inclination to enable dumping of material from the truck body.

20. The combination as defined in claim 17 wherein a safety cable is attached to the lift frame means adjacent the free end, said safety cable being entrained over pulley means at an elevated position, spring biased winch means engaging the safety cable for retaining the safety cable taut during swinging movement of the subframe, and means locking the safety cable to prevent linear movement thereof in the event the lift cable means breaks thereby preventing the subframe and truck body from dropping onto the vehicular frame.

References Cited by the Examiner
UNITED STATES PATENTS

| | | |
|---|---|---|
| 1,078,246 | 11/13 | Bruder. |
| 1,093,952 | 4/14 | Stephens. |
| 1,537,457 | 5/25 | Bryan _______________ 214—505 |
| 2,034,306 | 3/36 | Lowdermilk ___________ 298—19 |
| 2,254,910 | 9/41 | Richards et al. ________ 254—175 |
| 2,815,245 | 12/57 | Asperger _____________ 298—20 |
| 2,867,339 | 1/59 | Nelson _______________ 214—517 |
| 3,031,231 | 4/62 | Broughton. |

OTHER REFERENCES

Dempster Brothers Catalog Brief 160, published 1960, pages 20–23 relied on.

HUGO O. SCHULZ, *Primary Examiner*.